United States Patent
Fang et al.

(10) Patent No.: US 9,019,881 B2
(45) Date of Patent: Apr. 28, 2015

(54) METHOD AND SYSTEM FOR WAKING UP NODE B CELL

(75) Inventors: Jianmin Fang, Shenzhen (CN); Lifeng Han, Shenzhen (CN); Yin Gao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 251 days.

(21) Appl. No.: 13/809,974
(22) PCT Filed: Sep. 1, 2010
(86) PCT No.: PCT/CN2010/076542
§ 371 (c)(1),
(2), (4) Date: Jan. 14, 2013
(87) PCT Pub. No.: WO2012/027890
PCT Pub. Date: Mar. 8, 2012

(65) Prior Publication Data
US 2013/0114490 A1    May 9, 2013

(51) Int. Cl.
*H04W 52/02* (2009.01)
*H04W 48/14* (2009.01)
*H04W 84/04* (2009.01)

(52) U.S. Cl.
CPC .......... *H04W 52/0206* (2013.01); *H04W 48/14* (2013.01); *H04W 52/0229* (2013.01); *H04W 84/045* (2013.01); *Y02B 60/50* (2013.01)

(58) Field of Classification Search
CPC ... G06F 1/3203; G06F 9/4416; G06F 8/4432; H03G 3/3047; H03G 3/3068; G01S 5/02; G01S 19/14; H04B 7/18513; H04B 7/18515; H04B 7/18543; H04L 29/06; H04L 29/0809; H04L 29/06095; H04L 29/08072; H04L 29/08576; H04L 29/08657; H04L 29/08981; H04L 41/12; H04L 41/22; H04L 41/0213; H04L 41/0806; H04L 45/00; H04L 45/02; H04L 45/04; H04L 2012/5607; H04L 2012/5616; H04L 12/2434; H04L 67/146; H04L 41/0833; H04Q 11/0478; H04M 3/42229; H04W 4/02; H04W 8/18; H04W 8/26; H04W 36/08; H04W 36/12; H04W 36/14; H04W 36/18; H04W 36/30; H04W 36/32; H04W 52/02; H04W 52/08; H04W 52/40; H04W 52/146; H04W 52/0216; H04W 52/0229; H04W 52/0245; H04W 52/0277; H04W 64/00; H04W 84/12; H04W 84/18; H04W 88/08; H04W 92/02; H04W 48/14; H04W 52/0206; H04W 84/045; Y02B 60/50
USPC ................ 370/254, 310.2, 311; 709/222, 223, 709/227; 455/13.4, 343.5, 440, 442, 456.5, 455/456.6, 461
See application file for complete search history.

(56) References Cited

U.S. PATENT DOCUMENTS
8,792,851 B2 *  7/2014  Matsumura et al. .......... 455/403
(Continued)

FOREIGN PATENT DOCUMENTS
CN            1689358 A          10/2005
(Continued)

OTHER PUBLICATIONS

3rd Generation Partnership Project; technical Specification Group Core and Terminals; Non-Access-Stratum (NAS) protocol for Evolved Packet System (EPS); Stage 3, (release 9), 3GPP TS 24.301 V9.3.0 (Jun. 2010).*
(Continued)

*Primary Examiner* — Alpus H Hsu
*Assistant Examiner* — Dharmesh Patel
(74) *Attorney, Agent, or Firm* — Brundidge & Stanger, P.C.

(57) ABSTRACT

A method for waking up a Node B (NB) cell is provided. When a User Equipment (UE) in an idle state arrives in an area of a Home NB cell in which the UE ever resided, but does not search out signals of the Home cell, the UE reports Proximity Indication (PI) information to a network side through a specific Tracking Area Update (TAU) process; when determining that there is need to wake up the NB cell according to footprint information which is reported by the UE and obtained in the specific TAU process, the network side wakes up the NB cell. The method ensures that the UE in an idle state wakes up the sleeping Home NB cell (or macro cell) in time and gets service from the Home NB cell (or macro cell), thus a network coverage problem caused by cell sleeping for saving energy is avoided.

18 Claims, 4 Drawing Sheets

(56) References Cited

U.S. PATENT DOCUMENTS

| | | | |
|---|---|---|---|
| 2004/0043798 A1 | 3/2004 | Amerga | |
| 2007/0019586 A1* | 1/2007 | Nanda et al. | 370/335 |
| 2007/0230400 A1 | 10/2007 | Kuchibhotla | |
| 2008/0102896 A1 | 5/2008 | Wang | |
| 2010/0061356 A1* | 3/2010 | Qvarfordt et al. | 370/338 |
| 2014/0092871 A1 | 4/2014 | Wang et al. | |

FOREIGN PATENT DOCUMENTS

| | | |
|---|---|---|
| CN | 101416551 A | 4/2009 |
| CN | 101536560 A | 9/2009 |
| WO | WO 2010151186 A1 * | 12/2010 |

OTHER PUBLICATIONS

3G{{ TSG RAN WG3 Meeting # 66BIS, R3-100201, Energy Saving for HeNBs, Mitsubishi Electric, Jan. 2010 (Jan. 22, 2010).*
International Search Report in international application number: PCT/CN2010/076542, mailed on Jun. 9, 2011.
English Translation of the Written Opinion of the International Search Authority in international application number: PCT/CN2010/076542, mailed on Jun. 9, 2011.
Energy Saving for HeNBs Jan. 22, 2010.
Energy Saving for HeNBs May 1, 2010.
3GPP TS 24.301 V9.3.0 Jun. 2010.
Supplementary European Search Report in European application No. 10856577.1, mailed on Jul. 18, 2014.

* cited by examiner

METHOD AND SYSTEM FOR WAKING UP NODE B CELL

TECHNICAL FIELD

The disclosure relates to an energy-saving technology of a Home Node B (Home NB), and in particular to a method and a system for waking up a Home NB cell or a macro NB cell.

BACKGROUND

A Long Term Evolution (LTE) network of the 3rd generation mobile communication consists of an Evolved Universal Terrestrial Radio Access Network (E-UTRAN) and an Evolved Packet Core (EPC) network.

The E-UTRAN includes a set of Evolved Node Bs (eNBs). The EPC network has a flat architecture, and includes a Mobility Management Entity (MME), a Serving Gateway (S-GW) and the like. Wherein, the eNB and the MME/S-GW are connected through an S1 interface, and the eNBs can be connected with each other through an X2 interface. The S1 interface and the X2 interface are a logic interface. One MME/S-GW can manage one or more eNBs, and one eNB can also be controlled by a certain or multiple MMEs/S-GWs. One eNB can manage one or more cells.

An LTE Advanced (LTE-A) system is evolved from the LTE system, and has the same network architecture as the LTE system. Some new technologies, such as coordinated multiple points, spectrum aggregation and relay, are adopted in the LTE-A system to enhance the system performance.

With the development of wireless communication technology, a Home NB is introduced. The Home NB is a small-sized and low-power NB, which is deployed in home, office and other indoor places, and is mainly used to provide a higher service rate for users, reduce cost required by using high-rate service and make up the deficiency of coverage of an existing wireless communication network. The Home NB is advantaged in being affordable and convenient, low power, plug and play and the like.

As shown in FIG. 1 and FIG. 2, a Home NB user accesses a Core Network (CN) through a Home (e)Node B Access Network (H(e)NB AN), wherein the H(e)NB AN consists of a Home (e)Node B (H(e)NB) and a Home (e)Node B Gateway (H(e)NB GW). The main functions of the H(e)NB GW are: verifying security of the Home NB, processing register and access control of the Home NB and taking charge of exchanging data of the CN and the Home NB. A Home (e)Node B Management System (H(e)MS) is configured to perform maintenance and management on the Home NB, configure and control the Home NB according to requirement of an operator, and most mainly implement configuration management functions for the H(e)NB, wherein the configuration management functions include verification of location information and parameter configuration for the H(e)NB, and the parameter configuration mainly relates to ON-level parameter configuration, parameter configuration of a Radio Access Network (RAN) side and parameter configuration of Radio Frequency (RF). For the H(e)NB system, the H(e)NB can be directly connected with the MME not through the H(e)NB GW.

With the development of Home NB technology, a concept of a Close Subscriber Group (CSG) is introduced for performing grouping management on subscribers, wherein the premise that a subscriber belongs to a certain CSG is that an International Mobile Subscriber Identification (IMSI) number of a terminal device of the subscriber has signed with the CSG. With the introduction of the concept of the CSG, the Home NB introduces a concept aiming at a CSG access mode. The Home NB has three access modes, which are respectively Open access mode, Close access mode and Hybrid access mode. Wherein, the Home NB with the Open access mode allows the contract subscriber and the non-contract subscriber to access and is same as a normal macro cell; the Home NB with the Close access mode allows only the subscriber signed with the CSG to access; and the Home NB with the Hybrid access mode allows both the contract subscriber and the non-contract subscriber to access, but the contract subscriber is superior to the non-contract subscriber in use of resource, that is to say, in resource shortage situations, the Home NB serves the contract subscriber preferentially, and may switch the non-contract subscriber to other cells or release its signaling connection.

Determination of identity with which a User Equipment (UE) accesses a network can be completed according to an allowed CSG list of the UE. The allowed CSG list is an information list of all the signed CSGs of the UE and is stored in a network side and the UE respectively. If the CSG to which the Home NB accessed by the UE belongs is in the allowed CSG list of the UE, then the UE accesses the network as the CSG contract subscriber; otherwise, the UE accesses the network as the non-CSG contract subscriber. For the UE, information of a Home NB cell that the UE ever resided can be kept, for example, the UE can record an E-UTRAN Cell Global Identifier (ECGI), a Tracking Area Identifier (TAI), a CSG Identity (CSG ID), location information and the like of the cell, wherein these information are called footprint information. When the UE in a connection state approaches the Home NB cell again, the UE reports a Proximity Indication (PI) to the network side to notify the network, and the UE itself has approached a Home NB cell that the UE ever resided geographically.

At present, the telecom industry is gradually entering a meager profit era, so the telecom operators are increasingly paying attention to the link of reducing cost (such as energy saving and the like) while achieving growth by expanding market share and business lines. The number of NBs in wireless communication network is very large and energy consumption of the NBs is very high, so how to reduce energy consumption of the NB is one key energy-saving measure.

For a macro cell of the LTE system, an energy-saving function of the cell is implemented by opening and closing the cell. When the cell prepares to enter an energy-saving state, the eNB determines to close the cell and notifies neighbouring eNBs that this service cell has entered an energy-saving sleeping state. However, opening of the cell is waked up by an adjacent eNB; through a cell activating command, an adjacent cell generally wakes up, based on requirement of load and the like, the cell which is in an energy-saving sleeping state to serve a user network.

One way of waking up the Home NB in an energy-saving sleeping state is a triggering way of waking up the Home NB cell through PI reporting of the UE. When the UE learns, according to footprint information kept by the UE itself, that the UE arrives in an area of a Home NB cell in which the UE ever resided but does not search out signals of the Home NB cell, the UE reports PI information to indicate that there should be a Home NB cell but no signal is received; after receiving the PI information and determining that the Home NB cell has been in a sleeping state for saving energy, a network side can consider to wake up the Home NB cell, so as to prepare to provide service for the UE. However, the PI information is sent to the network side by the UE in a connection state.

For a UE in an idle state, when the UE arrives in an area of a Home NB cell in which the UE ever resided, the network side does not know; if the Home NB cell is in a sleeping state for saving energy, then the Home NB cell cannot provide service for the UE by adopting an existing way of waking up the Home NB cell in an energy-saving state.

SUMMARY

In view of the above, the main purpose of the disclosure is to provide a method and a system for waking up a Node B (NB) cell, which can wake up a Home NB cell or a macro NB cell in time to provide service for business that a UE in an idle state may initiate.

In order to achieve the above purpose, the technical solution of the disclosure is provided as follows.

A method for waking up an NB cell is provided, which includes the following steps:

a UE reports PI information to a network side through a specific Tracking Area Update (TAU) process; and when determining that there is need to wake up the NB cell according to footprint information which is reported by the UE and obtained in the specific TAU process, the network side wakes up the NB cell.

Before the UE is in an idle state, the method may further include that: the UE arrives in an area of an NB cell in which the UE ever resided, but does not search out signals of the NB cell.

That the UE reports the PI information to the network side through the specific TAU process may include that:

the UE sends a specific TAU request to the network side, wherein the TAU request carries the PI information and the footprint information of the NB cell in which the UE ever resided, and the PI information is set in an Evolved Packet System (EPS) update type field.

The method may further include that: the network side returns a specific TAU accept message to the UE; and an EPS update result field of the TAU accept message is set as PI acceptance.

The method may further include that: when determining that there is no need to wake up the NB cell, the network side returns a specific TAU reject message to the UE; and an EPS update result field of the TAU reject message is set as PI rejection.

That the network side wakes up the NB cell when determining that there is need to wake up the NB cell may include that:

the network side sends an energy-saving wakeup request message to an NB to which the cell in which the UE currently resides belongs, wherein the energy-saving wakeup request message carries the footprint information; and the NB to which the cell in which the UE currently resides belongs sends the energy-saving wakeup request message to a target Home NB according to information of the target Home NB cell indicated in the footprint information which is carried in the received energy-saving wakeup request message.

The method may further include that:

after determining that there is need to wake up the target Home NB cell with reference to the related information of the target Home NB cell, the NB to which the cell in which the UE currently resides belongs executes a step of sending the energy-saving wakeup request message to the Home NB.

That the network side wakes the NB cell when determining that there is need to wake up the NB cell may include that:

the network side sends the energy-saving wakeup request message to the target Home NB according to the information of the target Home NB cell indicated in the footprint information.

A system for waking up an NB cell is provided, which includes a network side and a UE, wherein the UE is configured to report PI information to the network side through a specific TAU process; and the network side is configured to, when determining that there is need to wake up the NB cell according to footprint information which is reported by the UE and obtained in the specific TAU process, wake up the NB cell.

The network side may be further configured to, when determining that there is need to wake up the NB cell, return a specific TAU accept message to the UE; and the network side may be further configured to, when determining that there is no need to wake up the NB cell, return a specific TAU reject message to the UE.

The system may further include an NB to which the cell in which the UE currently resides belongs;

the network side may be specifically configured to send an energy-saving wakeup request message to the NB to which the cell in which the UE currently resides belongs; and the NB to which the cell in which the UE currently resides belongs is configured to send an energy-saving wakeup request message to the target Home NB according to information of the target Home NB cell which is indicated in the footprint information carried in the received energy-saving wakeup request message.

The NB to which the cell in which the UE currently resides belongs may be further configured to determine that there is need to wake up the target Home NB cell with reference to the related information of the target Home NB cell.

The network side may be specifically configured to send the energy-saving wakeup request message to the target Home NB according to the information of the target Home NB cell indicated in the footprint information.

The network side may be an MME; and the NB cell may be a Home NB cell, or an evolved Home NB cell, or a macro NB cell.

It can be seen from the above technical solution provided by the disclosure that when the UE in an idle state arrives in an area of a Home NB cell in which the UE ever resided, but does not search out signals of the Home cell, or when the UE in an idle state finds that signals of the cell in which the UE currently resides get worse, and does not find other better cells, the UE reports the PI information to the network side through the specific TAU process; and when determining that there is need to wake up the NB cell according to the PI information which is reported by the UE and obtained in the specific TAU process, the network side wakes up the NB cell. By means of the specific TAU process of the disclosure, it is ensured that the UE in an idle state wakes up the sleeping Home NB cell (or macro cell) in time, so that the UE can get service from the Home NB cell (or macro cell) in time and thus a network coverage problem caused by cell sleeping for saving energy is avoided.

DETAILED DESCRIPTION

Figure 1:
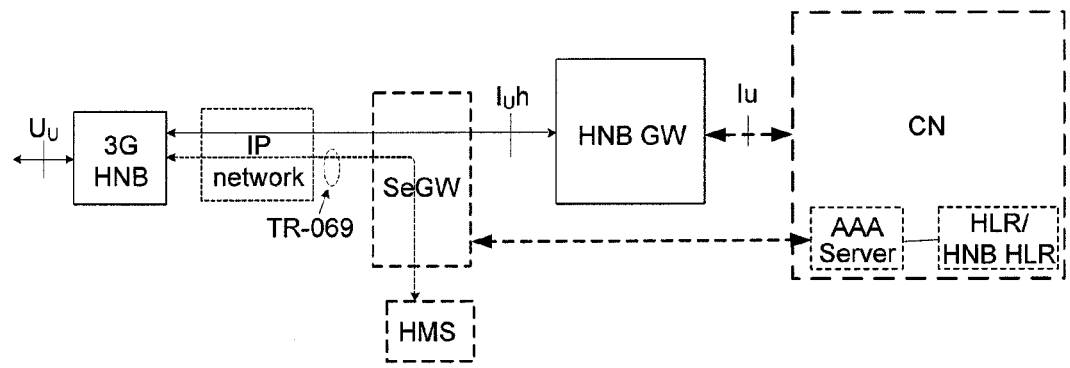
FIG. 1 shows a structure diagram of an existing HNB network.
Figure 2:
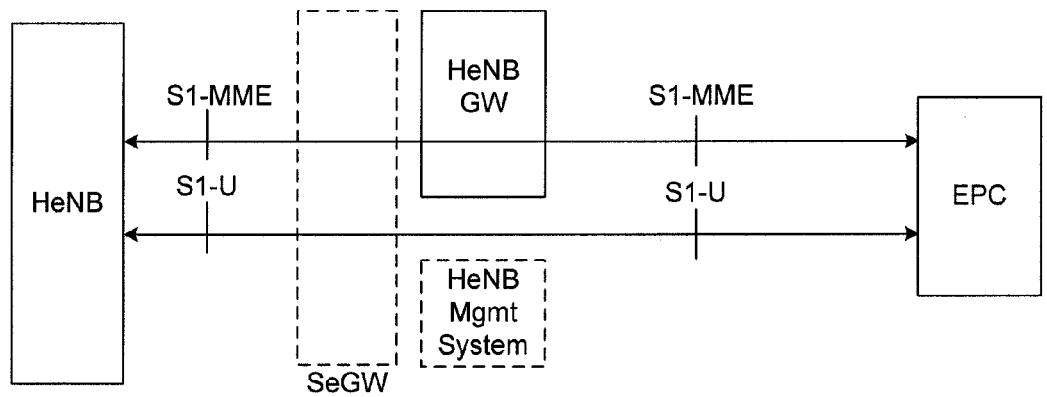
FIG. 2 shows a structure diagram of an existing HeNB network.
Figure 3:
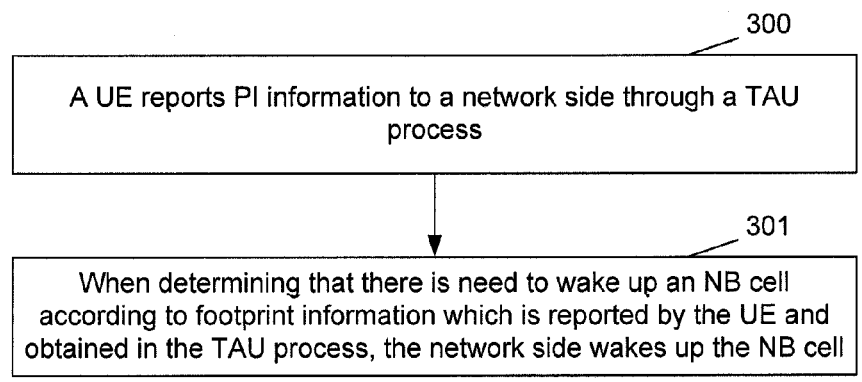
FIG. 3 shows a flowchart illustrating a method for waking up an NB cell according to the disclosure.

FIG. 3 shows a flowchart illustrating a method for waking up an NB cell according to the disclosure; as shown in FIG. 3, the method includes the following steps:

Step 300: a UE reports PI information to a network side through a TAU (Tracking Area Update) process.

In this step, when the UE in an idle state arrives in an area of a Home NB cell in which the UE ever resided, but does not search out signals of the Home NB cell, the UE will initiate a specific TAU process. In the specific TAU process of the disclosure, the specific TAU request that the UE sends to the network side carries footprint information of an NB cell in which the UE ever resided.

Step 301: when determining that there is need to wake up the NB cell according to the footprint information which is reported by the UE and obtained in the specific TAU process, the network side wakes up the NB cell, so as to prepare to provide service for the UE.

In this step, after receiving the specific TAU request reported by the UE, the network side does not perform conventional location update processing, but determines whether there is need to wake up the NB cell shown in the footprint information according to the footprint information carried in the specific TAU request.

In this step, the network side can initiate wakeup to the NB cell which needs wakeup directly or through the NB cell in which the UE currently resides.

Further, when determining that there is need to wake up the NB cell, the network side returns a specific TAU accept message to the UE; or, when determining that there is no need to wake up the NB cell, the network side returns a specific TAU reject message to the UE. When receiving the specific TAU accept message or the specific TAU reject message, the UE also does not perform conventional location update processing.

It should be noted that, when the UE in an idle state finds that signals of the cell in which it currently resides get worse, and does not find other better cells, the UE can also initiate the specific TAU process of the disclosure to the network side and can carry the current location information of the UE. After receiving the specific TAU request of the UE, the network side can look up whether there is a cell (including a macro cell and a Home NB cell) in a sleeping state around the UE; if there is a cell in a sleeping state around the UE, the cell can be woke up to avoid a network coverage problem.

Through the specific TAU process of the disclosure, it is ensured that the UE in an idle state wakes up the sleeping Home NB cell (or macro cell) in time, so that the UE can get service from the Home NB cell (or macro cell) in time, thus the network coverage problem caused by cell sleeping for saving energy is avoided.

Figure 4:
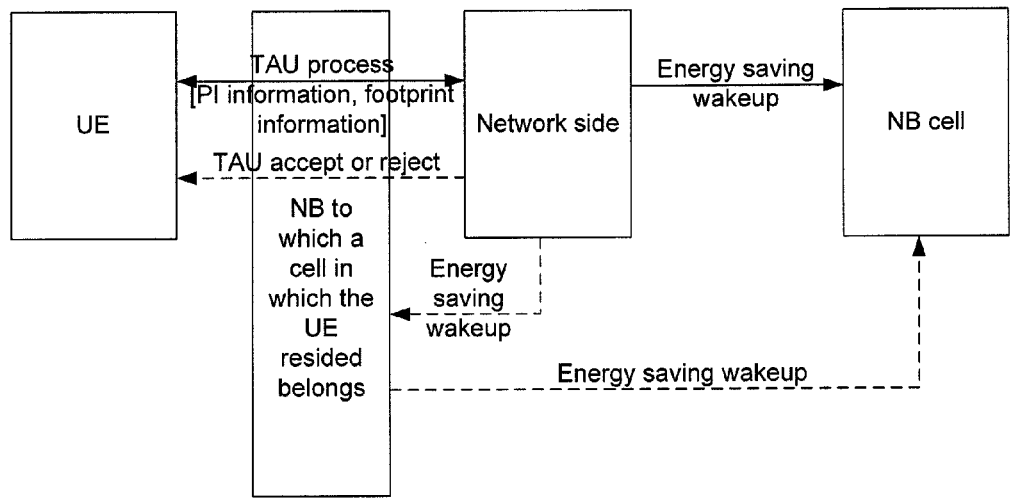
FIG. 4 shows a structure diagram illustrating a system for waking up an NB cell according to the disclosure.

Aiming at the method of the disclosure, a system for waking up an NB cell is provided; as shown in FIG. 4, the system at least includes a network side and a UE, wherein the UE is configured to report PI information to the network side through a specific TAU process; and the network side is configured to, when determining that there is need to wake up the NB cell according to the footprint information which is reported by the UE and obtained in the specific TAU process, wake up the NB cell. The network side can be an MME.

The network side is further configured to, when determining that there is need to wake up the NB cell, return a specific TAU accept message to the UE; or, when determining that there is no need to wake up the NB cell, return a specific TAU reject message to the UE.

The network side is specifically configured to send the energy-saving wakeup request message to the target Home NB according to the information of the target Home NB cell indicated in the footprint information. Or, the system further includes an NB to which the cell in which the UE currently resides belongs to, at this moment, the network side is specifically configured to send an energy-saving wakeup request message to the NB to which the cell in which the UE currently resides belongs; and the NB to which the cell in which the UE currently resides belongs is configured to send the energy-saving wakeup request message to the target Home NB according to information of the target Home NB cell indicated in the footprint information which is carried in the received energy-saving wakeup request message.

The NB to which the cell in which the UE currently resides belongs is further configured to determine that there is need to wake up the target Home NB cell with reference to the related information of the target Home NB cell.

The UE is in an idle state; and the UE is further configured to arrive in an area of an NB cell in which the UE ever resided, but do not search out signals of the NB cell; or, the UE is further configured to find that signals of a cell in which the UE currently resides get worse, and do not find other better cells.

The NB cell in the disclosure is a Home NB cell or a macro NB cell.

The method of the disclosure will be described in detail with reference to embodiments hereinafter; for simplifying description, the following embodiments are described by only taking the LTE system for example.

Figure 5:
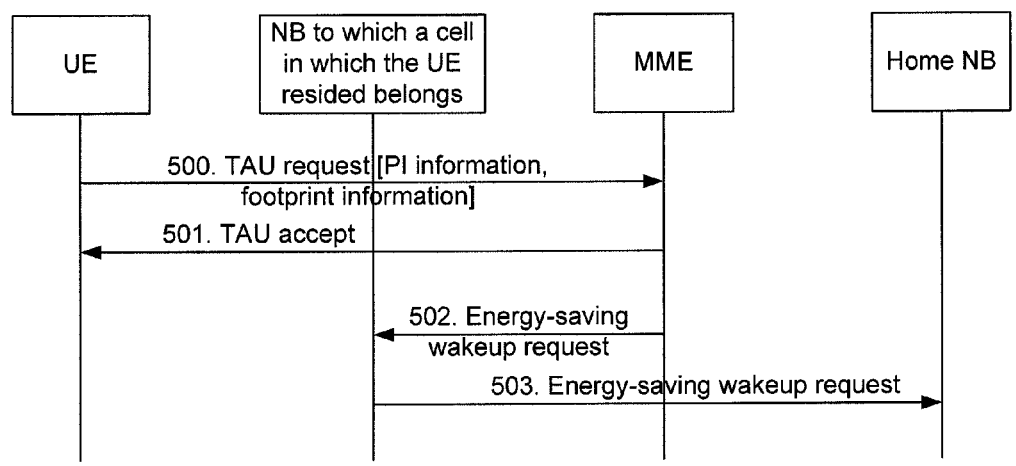
FIG. 5 shows a schematic diagram illustrating the method for waking up an NB cell according to the first embodiment of the disclosure.

FIG. 5 shows a schematic diagram illustrating the method for waking up an NB cell according to the first embodiment of the disclosure; as shown in FIG. 5, the method includes the following steps:

Step 500: when a UE in an idle state arrives in an area of a Home NB cell in which the UE ever resided, but does not search out signals of the Home NB cell, the UE initiates the specific TAU process of the disclosure.

This step specifically includes that: the UE sends a TAU request (TRACKING AREA UPDATE REQUEST) message to an MME through an eNB to which the cell in which the UE currently resides belongs, and sets an EPS update type field in the TAU request message as a specific type (such as PI), for informing the MME that the current TAU process is not a common TAU process, but a TAU process initiated by the UE in an idle state because the UE in an idle state arrives in an area of a Home NB cell that the UE ever resided but does not search out signals of the Home NB cell.

After receiving the TRACKING AREA UPDATE REQUEST message, the MME learns that the current TAU process is a specific TAU process according to the EPS update type (i.e., PI) in the message, for indicating that the UE arrives in an area of a Home NB cell in which the UE has resided, but does not search out signals of the Home NB cell. So, the network side does not perform conventional location update processing, but considers that there is need to wake up the Home NB cell indicated in footprint information after the footprint information which is carried in the received TAU request message is confirmed.

Wherein, the MME determining whether there is need to wake up the Home NB cell belongs to a related art, and its specific implementation is not intended to limit the scope of protection of the disclosure. Step 501: the MME returns a TAU accept (TRACKING AREA UPDATE ACCEPT) message to the UE, and sets an EPS update result field in the TAU accept message as a specific type (such as PI confirmation).

After receiving the TRACKING AREA UPDATE ACCEPT message, the UE leans that it is a specific TAU process according to the EPS update type shown as the PI confirmation in the TRACKING AREA UPDATE ACCEPT message, so the UE does not perform conventional location update processing.

Step 502: the MME sends the energy-saving wakeup request message to an eNB to which the cell in which the UE currently resides belongs, wherein the energy-saving wakeup request message carries the footprint information.

Step 503: after receiving the energy-saving wakeup request message from the MME, the eNB to which the cell in which the UE currently resides belongs sends the energy-saving wakeup request message to a Home NB (called a target NB) according to information of the target Home NB cell indicated in the footprint information which is carried in the energy-saving wakeup request message.

Here, the eNB to which the cell in which the UE currently resides belongs can also further determine, with reference to the related information of the target Home NB cell that the eNB itself has known, whether there is need to wake up the target Home NB cell, namely whether there is need to send the energy-saving wakeup request message to the target Home NB. Wherein, the eNB determining, with reference to the related information of the target Home NB cell that the eNB itself has known, whether there is need to wake up the target Home NB cell belongs to a related art, and its specific implementation is not intended to limit the scope of protection of the disclosure.

Figure 6:
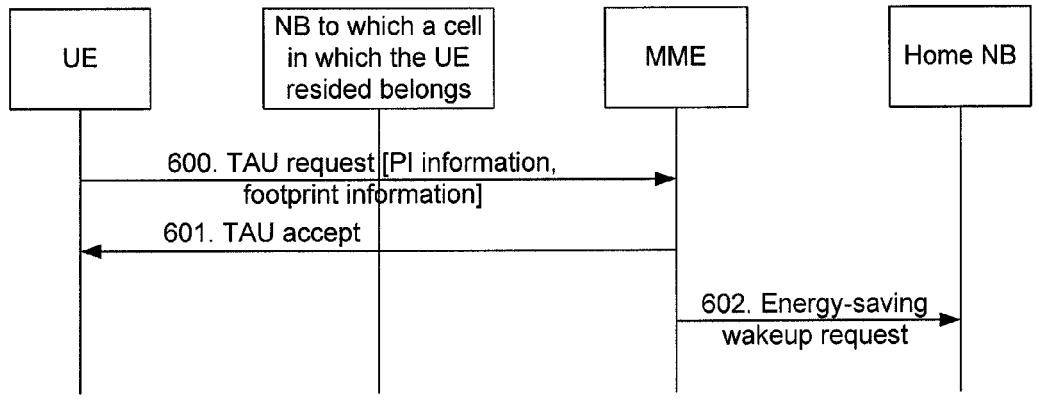
FIG. 6 shows a schematic diagram illustrating the method for waking up an NB cell according to the second embodiment of the disclosure.

FIG. 6 shows a schematic diagram illustrating the method for waking up an NB cell according to the second embodiment of the disclosure; as shown in FIG. 6, the method includes the following steps:

Step 600: when a UE in an idle state arrives in an area of a Home NB cell in which the UE ever resided, but does not search out signals of the Home NB cell, the UE initiates the TAU process of the disclosure.

This step specifically includes that: the UE sends a TAU request (TRACKING AREA UPDATE REQUEST) message to an MME through an eNB to which the cell in which the UE currently resides belongs, and sets an EPS update type field in the TAU request message as a specific type (such as PI), for informing the MME that the current TAU process is not a common TAU process, but a TAU process initiated by the UE in an idle state because the UE in an idle state arrives in an area of a Home NB cell that the UE ever resided, but does not search out signals of the Home NB cell.

After receiving the TRACKING AREA UPDATE REQUEST message, the MME learns that the current TAU process is a specific TAU process according to the EPS update type (i.e., PI) in the message, for indicating that the UE arrives in an area of a Home NB cell in which the UE has resided, but does not search out signals of the Home NB cell. So, the network side does not perform conventional location update processing, but considers that there is need to wake up the Home NB cell indicated in footprint information after the footprint information which is carried in the received TAU request message is confirmed.

Wherein, the MME determining whether there is need to wake up the Home NB cell belongs to a related art, and its specific implementation is not intended to limit the scope of protection of the disclosure.

Step 601: the MME returns the TAU accept (TRACKING AREA UPDATE ACCEPT) message to the UE, and sets an EPS update result field in the TAU accept message as a specific type (such as PI confirmation).

After receiving the TRACKING AREA UPDATE ACCEPT message, the UE leans that it is a specific TAU process according to the EPS update type shown as the PI acceptance in the TRACKING AREA UPDATE ACCEPT message, so the UE does not perform conventional location update processing.

Step 602: the MME sends the energy-saving wakeup request message to a Home NB (called a target NB) according to information of the Home NB cell indicated in the footprint information which is carried in the TRACKING AREA UPDATE REQUEST message.

Figure 7:
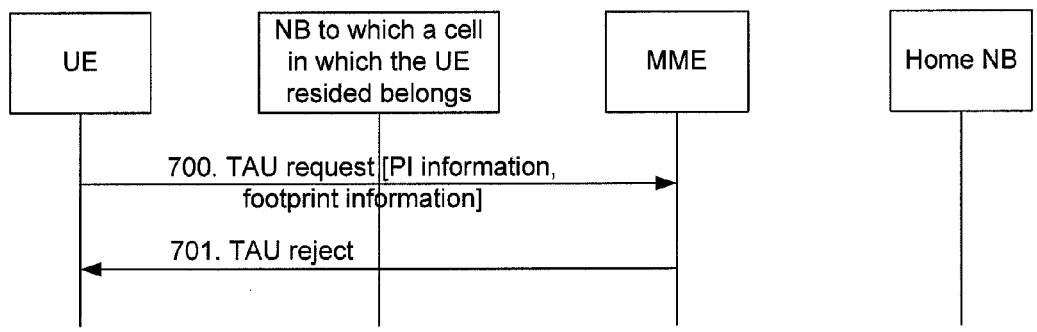
FIG. 7 shows a schematic diagram illustrating the method for waking up an NB cell according to the third embodiment of the disclosure.

FIG. 7 shows a schematic diagram illustrating the method for waking up an NB cell according to the third embodiment of the disclosure; as shown in FIG. 7, the method includes the following steps:

Step 700: when a UE in an idle state arrives in an area of a Home NB cell in which the UE ever resided, but does not search out signals of the Home NB cell, the UE initiates the TAU process of the disclosure.

This step specifically includes that: the UE sends a TAU request (TRACKING AREA UPDATE REQUEST) message to an MME through an eNB to which the cell in which the UE currently resides belongs, and sets an EPS update type field in the TAU request message as a specific type (such as PI), for informing the MME that the current TAU process is not a common TAU process, but a TAU process initiated by the UE in an idle state because the UE in an idle state arrives in an area of a Home NB cell that the UE ever resided, but does not search out signals of the Home NB cell.

After receiving the TRACKING AREA UPDATE REQUEST message, the MME learns that the current TAU process is a specific TAU process according to the EPS update type (i.e., PI) in the message, for indicating that the UE arrives in an area of a Home NB cell in which the UE has resided, but does not search out signals of the Home NB cell. So, the network side does not perform conventional location update processing, but considers that there is no need to wake up the Home NB cell indicated in the footprint information after the footprint information which is carried in the received TAU request message is confirmed.

Wherein, the MME determining whether there is need to wake up the Home NB cell belongs to a related art, and its specific implementation is not intended to limit the scope of protection of the disclosure. Step 701: the MME returns a TAU reject (TRACKING AREA UPDATE REJECT) message to the UE, and sets an EPS update result field in the TAU accept message as a specific type (such as PI rejection).

After receiving the TRACKING AREA UPDATE REJECT message, the UE leans that it is a specific TAU process according to the EPS update type shown as the PI rejection in the TAU accept message, so the UE does not perform conventional location update processing.

Figure 8:
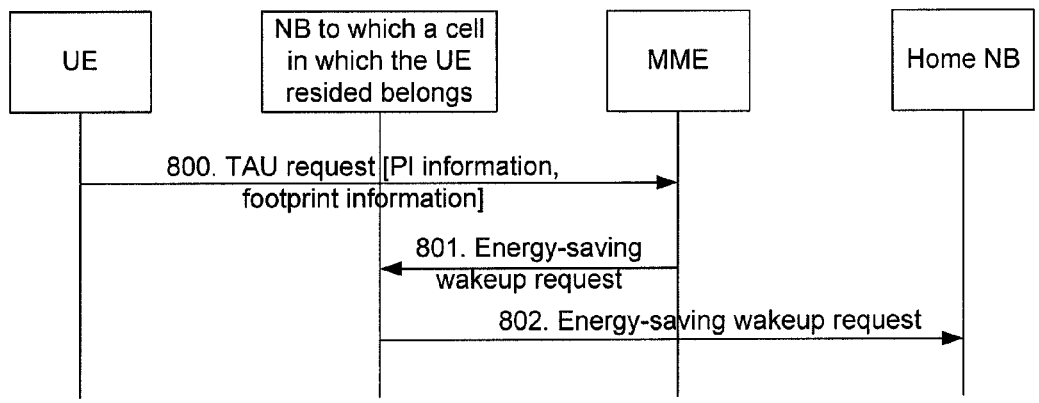
FIG. 8 shows a schematic diagram illustrating the method for waking up an NB cell according to the fourth embodiment of the disclosure.

FIG. 8 shows a schematic diagram illustrating the method for waking up an NB cell according to the fourth embodiment of the disclosure; as shown in FIG. 8, the method includes the following steps:

Step 800: when a UE in an idle state arrives in an area of a Home NB cell in which the UE ever resided, but does not search out signals of the Home NB cell, the UE initiates the TAU process of the disclosure.

This step specifically includes that: the UE sends a TAU request (TRACKING AREA UPDATE REQUEST) message to an MME through an eNB to which the cell in which the UE currently resides belongs, and sets an EPS update type field in the TAU request message as a specific type (such as PI), for informing the MME that the current TAU process is not a common TAU process, but a TAU process initiated by the UE in an idle state because the UE in an idle state arrives in an area of a Home NB cell that the UE ever resided, but does not search out signals of the Home NB cell.

After receiving the TRACKING AREA UPDATE REQUEST message, the MME learns that the current TAU process is a specific TAU process according to the EPS update type (i.e., PI) in the message, for indicating that the UE arrives in an area of a Home NB cell in which the UE has resided, but does not search out signals of the Home NB cell. So, the network side does not perform conventional location update processing, but considers that there is need to wake up the Home NB cell indicated in footprint information after the footprint information which is carried in the received TAU request message is confirmed.

Wherein, the MME determining whether there is need to wake up the Home NB cell belongs to a related art, and its specific implementation is not intended to limit the scope of protection of the disclosure.

Step 801: the MME sends the energy-saving wakeup request message to an eNB to which the cell in which the UE currently resides belongs, wherein the energy-saving wakeup request message carries the footprint information.

Step 802: after receiving the energy-saving wakeup request message from the MME, the eNB to which the cell in which the UE currently resides belongs sends the energy-saving wakeup request message to a Home NB (called a target NB) according to information of the Home NB cell indicated in the footprint information which is carried in the energy-saving wakeup request message.

Here, the eNB to which the cell in which the UE currently resides belongs can also further determine, with reference to the related information of the target Home NB cell that the eNB itself has known, whether there is need to wake up the target Home NB cell, namely whether there is need to send the energy-saving wakeup request message to the target Home NB. Wherein, the eNB determining, with reference to the related information of the target Home NB cell that the eNB itself has known, whether there is need to wake up the target Home NB cell belongs to a related art, and its specific implementation is not intended to limit the scope of protection of the disclosure.

In the fourth embodiment, after initiating the TAU request, the UE will start a timer (such as a T3430 timer); if the TAU accept or reject message from the MME has not been received after the T3430 timer expires, the specific TAU process is terminated.

Figure 9:
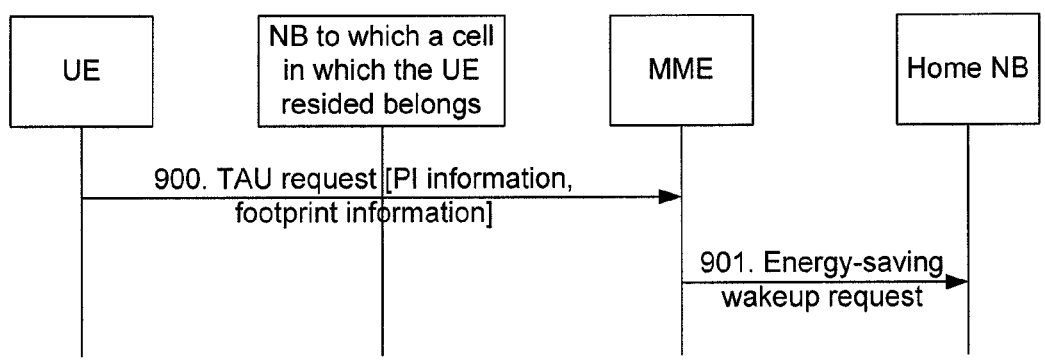
FIG. 9 shows a schematic diagram illustrating the method for waking up an NB cell according to the fifth embodiment of the disclosure.

FIG. 9 shows a schematic diagram illustrating the method for waking up an NB cell according to the fifth embodiment of the disclosure; as shown in FIG. 9, the method includes the following steps:

Step 900: when a UE in an idle state arrives in an area of a Home NB cell in which the UE ever resided, but does not search out signals of the Home NB cell, the UE initiates the TAU process of the disclosure.

This step specifically includes that: the UE sends a TAU request (TRACKING AREA UPDATE REQUEST) message to an MME through an eNB to which the cell in which the UE currently resides belongs, and sets an EPS update type field in the TAU request message as a specific type (such as PI), for informing the MME that the current TAU process is not a common TAU process, but a TAU process initiated by the UE in an idle state because the UE in an idle state arrives in an area of a Home NB cell that the UE ever resided, but does not search out signals of the Home NB cell.

After receiving the TRACKING AREA UPDATE REQUEST message, the MME learns that the current TAU process is a specific TAU process according to the EPS update type (i.e., PI) in the message, for indicating that the UE arrives in an area of a Home NB cell in which the UE has resided, but does not search out signals of the Home NB cell. So, the network side does not perform conventional location update processing, but considers that there is need to wake up the Home NB cell indicated in footprint information after the footprint information which is carried in the received TAU request message is confirmed.

Wherein, the MME determining whether there is need to wake up the Home NB cell belongs to a related art, and its specific implementation is not intended to limit the scope of protection of the disclosure.

Step 901: the MME sends the energy-saving wakeup request message to a Home NB (called a target NB) according to information of the Home NB cell indicated in the footprint information which is carried in the message.

In the fifth embodiment, after initiating the TAU request, the UE will start a timer (such as a T3430 timer); if the TAU accept or reject message from the MME has not been received after the T3430 timer expires, the specific TAU process is terminated.

Figure 10:
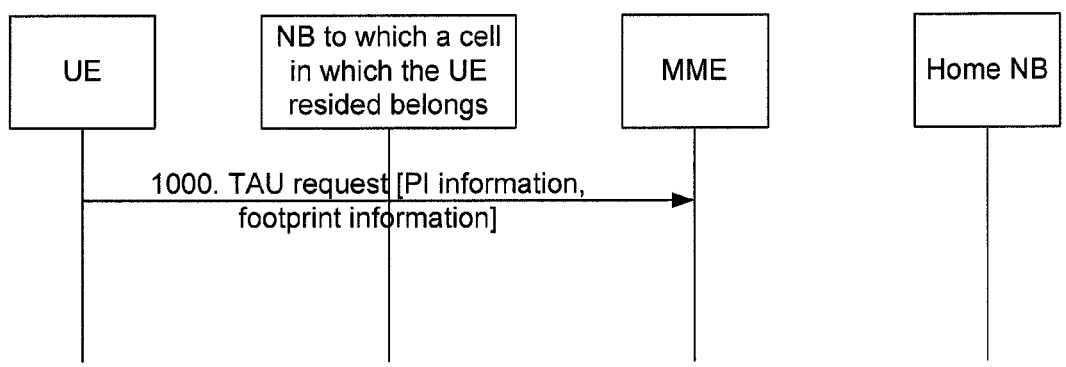
FIG. 10 shows a schematic diagram illustrating the method for waking up an NB cell according to the sixth embodiment of the disclosure.

FIG. 10 shows a schematic diagram illustrating the method for waking up an NB cell according to the sixth embodiment of the disclosure; as shown in FIG. 10, the method includes the following steps:

Step 1000: when a UE in an idle state arrives in an area of a Home NB cell in which the UE ever resided, but does not search out signals of the Home NB cell, the UE initiates the TAU process of the disclosure.

This step specifically includes that: the UE sends a TAU request (TRACKING AREA UPDATE REQUEST) message to an MME through an eNB to which the cell in which the UE currently resides belongs, and sets an EPS update type field in the TAU request message as a specific type (such as PI), for informing the MME that the current TAU process is not a common TAU process, but a TAU process initiated by the UE in an idle state because the UE in an idle state arrives in an area of a Home NB cell that the UE ever resided, but does not search out signals of the Home NB cell.

After receiving the TRACKING AREA UPDATE REQUEST message, the MME learns that the current TAU process is a specific TAU process according to the EPS update type (i.e., PI) in the message, for indicating that the UE arrives in an area of a Home NB cell in which the UE has resided, but does not search out signals of the Home NB cell. So, the network side does not perform conventional location update processing, but considers that there is no need to wake up the Home NB cell indicated in the footprint information after the footprint information which is carried in the received TAU request message is confirmed.

Wherein, the MME determining whether there is need to wake up the Home NB cell belongs to a related art, and its specific implementation is not intended to limit the scope of protection of the disclosure.

In the sixth embodiment, after initiating the TAU request, the UE will start a timer (such as a T3430 timer); if the TAU accept or reject message from the MME has not been received after the T3430 timer expires, the specific TAU process is terminated.

The above are only the preferred embodiments of the disclosure and are not intended to limit the scope of protection of the disclosure; any modifications, equivalent replacements, improvements or the like within the spirit and principle of the disclosure shall fall within the scope of protection of the disclosure.

The invention claimed is:

1. A method for waking up a Node B (NB) cell, comprising:
   when a User Equipment (UE) in an idle state arrives in an area of an NB cell in which the UE ever resided, but does not search out signals of the NB cell,
   reporting, by the UE, Proximity Indication (PI) information to a network side through a specific Tracking Area Update (TAU) process; and
   waking up the NB cell by the network side when determining that there is a need to wake up the NB cell according to footprint information which is reported by the UE and obtained in the specific TAU process,
   wherein reporting, by the UE, the PI information to the network side through the specific TAU process comprises:
   sending, by the UE, a specific TAU request to the network side,
   wherein the TAU request carries the PI information and the footprint information of the NB cell in which the UE ever resided, and a value of the PI information is set in an Evolved Packet System (EPS) update type field.

2. The method according to claim 1, further comprising:
   returning, by the network side, a specific TAU accept message to the UE; and
   setting an EPS update result field of the TAU accept message as PI acceptance.

3. The method according to claim 1, further comprising:
   returning a specific TAU reject message to the UE by the network side when determining that there is no need to wake up the NB cell; and
   setting an EPS update result field of the TAU reject message as PI rejection.

4. The method according to claim 1, wherein the waking up the NB cell by the network side when determining that there is need to wake up the NB cell comprises:
   sending, by the network side, an energy-saving wakeup request message to an NB to which the cell in which the UE currently resides belongs, wherein the energy-saving wakeup request message carries the footprint information; and
   sending, by the NB to which the cell in which the UE currently resides belongs, the energy-saving wakeup request message to a target Home NB according to information of the target Home NB cell indicated in the footprint information which is carried in the received energy-saving wakeup request message.

5. The method according to claim 4, further comprising:
   executing, by the NB to which the cell in which the UE currently resides belongs, a step of sending the energy-saving wakeup request message to the Home NB after determining that there is a need to wake up the target Home NB cell with reference to the related information of the target Home NB cell, the NB that the cell in which the UE currently resides belongs to executes a step of sending the energy-saving wakeup request message to the target Home NB.

6. The method according to claim 1, wherein the waking up, by the network side, the NB cell when determining that there is a need to wake up the NB cell comprises:
   sending, by the network side, the energy-saving wakeup request message to a target Home NB according to the information of the target Home NB cell indicated in the footprint information.

7. The method according to claim 2, wherein the waking up the NB cell by the network side when determining that there is need to wake up the NB cell comprises:
   sending, by the network side, an energy-saving wakeup request message to an NB to which the cell in which the UE currently resides belongs, wherein the energy-saving wakeup request message carries the footprint information; and
   sending, by the NB to which the cell in which the UE currently resides belongs, the energy-saving wakeup request message to a target Home NB according to information of the target Home NB cell indicated in the footprint information which is carried in the received energy-saving wakeup request message.

8. The method according to claim 7, further comprising:
   executing, by the NB to which the cell in which the UE currently resides belongs, a step of sending the energy-saving wakeup request message to the Home NB after determining that there is need to wake up the target Home NB cell with reference to the related information of the target Home NB cell, the NB that the cell in which the UE currently resides belongs to executes a step of sending the energy-saving wakeup request message to the target Home NB.

9. The method according to claim 2, wherein the waking up, by the network side, the NB cell when determining that there is need to wake up the NB cell comprises:
   sending, by the network side, the energy-saving wakeup request message to the target Home NB according to the information of the target Home NB cell indicated in the footprint information.

10. A system for waking up a Node B (NB) cell, comprising:
    a network side and a User Equipment (UE),
    wherein the UE is configured to, when the UE in an idle state arrives in an area of an NB cell in which the UE ever resided, but does not search out signals of the NB cell, report PI information to the network side through a specific Tracking Area Update (TAU) process,
    wherein the network side is configured to, when determining that there is a need to wake up the NB cell according to the footprint information which is reported by the UE and obtained in the specific TAU process, wake up the NB cell, and
    wherein to report the PI information to the network side through the specific TAU process, the UE is configured to send a specific TAU request to the network side, wherein the TAU request carries the PI information and the footprint information of the NB cell in which the UE ever resided, and a value of the PI information is set in an Evolved Packet System (EPS) update type field.

11. The system according to claim 10, wherein the network side is further configured to, when determining that there is a need to wake up the NB cell, return a specific TAU accept message to the UE; and the network side is further configured to, when determining that there is no need to wake up the NB cell, return a specific TAU reject message to the UE.

12. The system according to claim 10, further comprising:
an NB to which the cell in which the UE currently resides belongs;
the network side is specifically configured to send an energy-saving wakeup request message to the NB to which the cell in which the UE currently resides belongs; and
the NB to which the cell in which the UE currently resides belongs is configured to send the energy-saving wakeup request message to the target Home NB according to information of the target Home NB cell indicated in the footprint information which is carried in the received energy-saving wakeup request message.

13. The system according to claim 12, wherein, the NB to which the cell in which the UE currently resides belongs is further configured to determine that there is a need to wake up the target Home NB cell with reference to the related information of the target Home NB cell.

14. The system according to claim 10, wherein the network side is specifically configured to send the energy-saving wakeup request message to the target Home NB according to the information of the target Home NB cell indicated in the footprint information.

15. The system according to claim 10, wherein the network side is a Mobility Management Entity (MME); and
the NB cell is a Home NB cell, or an evolved Home NB cell, or a macro NB cell.

16. The system according to claim 11, further comprising an NB to which the cell in which the UE currently resides belongs;
the network side is specifically configured to send an energy-saving wakeup request message to the NB to which the cell in which the UE currently resides belongs; and
the NB to which the cell in which the UE currently resides belongs is configured to send the energy-saving wakeup request message to the target Home NB according to information of the target Home NB cell indicated in the footprint information which is carried in the received energy-saving wakeup request message.

17. The system according to claim 16, wherein,
the NB to which the cell in which the UE currently resides belongs is further configured to determine that there is a need to wake up the target Home NB cell with reference to the related information of the target Home NB cell.

18. The system according to claim 11, wherein the network side is specifically configured to send the energy-saving wakeup request message to the target Home NB according to the information of the target Home NB cell indicated in the footprint information.

* * * * *